J. E. Q. MADDOX & G. P. HUMPHRIES.
Gate.
No. 213,119. Patented Mar. 11, 1879.
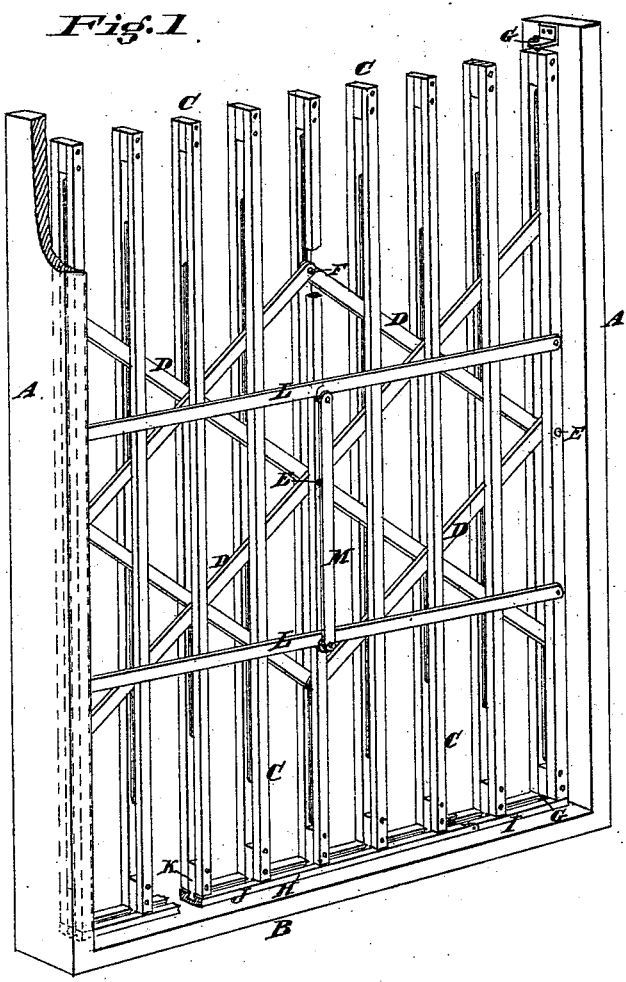
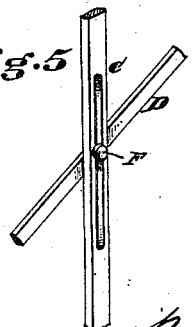

UNITED STATES PATENT OFFICE.

JAMES E. Q. MADDOX, OF CINCINNATI, OHIO, AND GEORGE P. HUMPHRIES, OF ALEXANDRIA, KENTUCKY, ASSIGNORS OF ONE-THIRD OF THEIR RIGHT TO WALTER W. BOSTWICK, OF CINCINNATI, OHIO.

IMPROVEMENT IN GATES.

Specification forming part of Letters Patent No. 213,119, dated March 11, 1879; application filed August 15, 1878.

*To all whom it may concern:*

Be it known that we, JAMES E. Q. MADDOX, of Cincinnati, Hamilton county, State of Ohio, and GEORGE P. HUMPHRIES, of Alexandria, Campbell county, State of Kentucky, have invented certain new and useful Improvements in Gates; and we do hereby declare the following to be a full, clear, and exact description of the same, which will enable others skilled in the art to which our invention relates to make and use the same, reference being had to the accompanying drawings, forming part of this specification, in which—

Figure 1 is a perspective view of our improved gate, partly in section, showing the gate open. Fig. 2 is a side elevation of the same in a closed position. Fig. 3 is a perspective view of the folding track. Fig. 4 is a transverse section of one of the vertical bars or pickets, showing its connection with the cross-braces; and Fig. 5 is a modification of the same.

Similar letters refer to similar parts.

Our invention has for its object to improve the gate for hallways and other places for which Letters Patent of the United States, No. 191,984, were granted and issued to James E. Q. Maddox, June 12, 1877. The gate described in said patent consists in a series of vertical pickets or bars connected together in different lines by means of knuckle-joints with stops, the whole arranged so as to be drawn out from the wall across a doorway or other opening to fill the space, and to fold up close together against the wall into a small compass when not required for use, grooved tracks or base-plates being employed to guide the sliding pickets in their movements, and to fold up out of the way when not so employed.

Our improvement in the present instance consists in so combining a series of cross and connecting braces or bars with the pickets, instead of employing knuckle-joints, as to strengthen and support the gate, and adapt it to slide upon its support without changing the vertical position of the pickets, and at the same time preserving their parallelism when the gate is opening and closing.

It also consists in combining two or more jointed brace-bars with the pickets for the purpose of holding the gate open.

It also consists in the combination of a vertical bar with the brace-bars, for the purpose of operating the latter simultaneously.

It also consists in the means employed for guiding and holding the pickets in the gutter-plates.

In the accompanying drawings, A A represent the side jambs of a doorway or other opening to which the gate is to be applied, and B the sill or base of the opening. The gate is composed of a series of uprights or pickets, C C, connected together by the cross-braces D D. These braces are pivoted to the pickets at two or more central points, E E; the upper and lower points of connection being adapted to slide vertically within side grooves or slots formed in the pickets, as shown in Fig. 1. These points of connection are formed by pins or studs F, which slide freely within the grooves when the gate is opened and closed.

In Fig. 1 the pickets are shown with the cross-braces passing through them and the pins working within grooves in the proximate faces of each part. In Fig. 5 the pickets are shown with slots and a headed pin connecting the braces upon one side. Either form may be adopted, as circumstances require; but we prefer the double picket as being the strongest and most secure.

To prevent the pins from binding they are made a little smaller than the holes in the braces and the width of the grooves in the pickets, thereby permitting a free and rolling movement of the parts.

In operating the gate thus constructed, the pins traverse up and down within their grooves, being limited by the length thereof, which should be proportioned to the distance apart the pickets are to be spread; and when this distance is reached the pins, striking the ends of the grooves, strengthen and support the parts. The braces not only serve to open and close the gate, but also brace it laterally as well as in the line of its movements in the most effective manner. The pins also serve to space the pickets and preserve their parallelism during the opening and closing movements. One of the end pickets, or a suitable upright connected therewith, is hinged at G G to one of the door-jambs or side of the opening to be protected, so that when the gate is shut—that is to say, when the pickets are folded against each other—it can be swung around and rest against the side of the opening out of the way.

H is the track for the bottom of the pickets. One portion, I, of this track is formed with the bottom hinge, and is about equal in length to the space occupied by the pickets when closed together; and the other portion, J, is hinged to the fixed portion, so that it can be turned up out of the way against the pickets when not required for use. The groove in this track is made in dovetail form to receive a corresponding block, K, in the ends of the pickets, so that when the pickets are being moved along, or the gate extended, they cannot be lifted out of the track or casually displaced. Instead of employing the block K, the ends of the pickets themselves may be dovetailed.

L L are the locking-bars, each formed with a central rule-joint, and pivoted at their ends to the end pickets of the gate, or to one end picket and the door-jamb or upright connected therewith. These bars serve, when the gate is extended, to lock it in place by means of the rule-joints, as will be readily understood.

Inasmuch as some means are required to break these joints simultaneously when the gate is to be closed, a vertical bar, M, is provided, connecting them together at the center. By lifting upon this bar both locking-bars L L are raised at the center, and the pickets may then be pushed back. This vertical lifting-bar may also serve to fold the pickets by a continued pull upon it, and should be provided with a hand-knob upon the side to facilitate their operation.

The jointed locking-bars are preferably used upon jail-gates, but, of course, may be applied to any other gate, if found desirable.

Instead of employing a single gate to close an opening, two short gates may be used, operated from each side the opening, so as to meet at the center, where they should be properly secured to each other.

If the opening is very wide, more than two sections may be used, or even in a narrow opening several sections may be used.

Having thus described our invention, what we claim is—

1. A gate for hallways and other places, consisting of a series of upright pickets, and a series of cross and connecting braces or bars pivoted to the pickets at two or more central points, and having upper and lower points of connection arranged to slide vertically within or upon the pickets, whereby the latter are adapted to slide upon a base-support across the gate-opening without changing their parallelism or their positions vertically, substantially as described, for the purpose specified.

2. The sliding pickets constructed with grooves or slots to receive the pins or rivets of the connecting-braces, substantially as described.

3. The combination of a dovetail guide-track with a dovetail formed on or attached to the lower ends of the sliding pickets, substantially as described, for the purpose specified.

4. A dovetailed guide-track for the lower ends of the sliding pickets, consisting of a fixed and a movable part, substantially as described, for the purpose specified.

5. In a gate for hallways and other places, the combination of two or more locking-braces having rule-joints with a series of sliding pickets, substantially as described, for the purpose specified.

6. The combination of two or more locking-braces having rule-joints with the series of sliding pickets and the cross and connecting braces, substantially as described, for the purpose specified.

7. The vertical lifting-bar M, in combination with the locking-braces and the sliding pickets, substantially as described, for the purpose specified.

In testimony of which invention we hereunto set our hands.

JAMES E. Q. MADDOX.
GEORGE P. HUMPHRIES.

Witnesses:
JOHN E. JONES,
EDGAR J. GROSS.